Patented Oct. 18, 1932

1,883,366

UNITED STATES PATENT OFFICE

DANIEL M. GRAY, OF WHEELING, WEST VIRGINIA, ASSIGNOR TO HAZEL-ATLAS GLASS CO., OF WHEELING, WEST VIRGINIA, A CORPORATION OF WEST VIRGINIA

PACKING AND PRESERVING NUTS IN GLASS CONTAINERS

No Drawing.    Application filed November 6, 1928.   Serial No. 317,692.

It is desirable to pack shelled nuts in glass containers, for the reason that the contents are exposed to view, and for the further reason that the package presents a much more attractive appearance than the ordinary tins. The packing of shelled nuts in glass containers has been very successful, and immense quantities are annually packed and sold. And while such packages present a far more attractive appearance than ordinary tins, yet there is one undesirable feature which has detracted, to a considerable extent, from both the appearance of the nuts and the appearance of the package as a whole. It is a matter of common observation that glass containers packed with pecans, almonds, peanuts, etc., do not have a perfectly clean and transparent appearance. This is due to a white deposit, which usually is the heaviest at the points where the nuts, or other oily substances are in contact with the glass. This white deposit, which detracts from the appearance of the package as a whole as well as from the contents of the package, is a soap. The oils found in practically all edible nuts are glycerides of fatty acids which, in contact with the alkalis in the glass, are saponified.

The purpose of the present invention is to eliminate this objectionable soapy deposit which results from the chemical action between the glass of the container and the oils of nuts or other oily food products; and provide a glass package which will retain its clear transparency and which will preserve the shelled nuts, or other oily food products, in their original appearance.

I have discovered that these highly desirable results are accomplished by coating the inside of the glass containers with a colorless, odorless, tasteless, and transparent lacquer. By careful experiment, extending over a considerable period of time, it has been determined that by the use of this lacquer, which insulates the nuts from the glass of the container, the undesirable white deposit is entirely eliminated, and the package as a whole, as well as the nuts, retain the same attractive appearance as they present the day they are packed. And this is accomplished without making any reduction whatever in the moisture content of the nuts, so that they retain their original palatable flavor; and also without affecting the transparency of the container.

Merely by way of example, and without in any manner limiting the invention, a formula for a suitable lacquer is given below:

| Lacquer | Parts by weight |
|---|---|
| Pyroxylin (½ sec.) | 20 |
| Dibutyl phthalate | 10 |
| Toluene | 30 |
| Mineral thinner | 30 |
| Ethyl acetate | 15 |
| Mono-ethyl ether of ethylene glycol | 15 |
| Gum solution | 30 |

| Gum solution | |
|---|---|
| Gum dammar | 80 |
| Mineral thinner | 40 |
| Ethyl acetate | 20 |
| Ethyl alcohol | 100 |

| Thinner | |
|---|---|
| Toluene | 75 |
| Ethyl acetate | 15 |
| Mono-ethyl ether of ethylene glycol | 10 |

Of course, the lacquer is thinned with the appropriate amount of thinner to provide the proper consistency for satisfactorily spraying or dipping.

As indicated above, the invention is in no manner limited to this particular lacquer; and, in fact, it is not limited to a lacquer at all, but relates broadly to insulating a transparent glass container from the oils of nuts or other oily foods, by means of any transparent substance or material.

As the glass container may be of any desired style, size or shape, and as it may be sealed in vaccuo, or otherwise; and as the invention is in no manner limited to a particular container, except that it be made of transparent glass, it is deemed unnecessary and undesirable to attempt to illustrate the invention by drawings.

Having fully described the invention, what

I claim as new and desire to secure by Letters Patent is:

1. A package of shelled nuts, comprising a transparent glass container and transparent insulating lacquer applied as a coating to the interior of the container, to prevent the formation of a white deposit.

2. A package of shelled nuts comprising a transparent glass container and a coating of transparent, colorless, odorless and tasteless lacquer on the interior of the container, to prevent the formation of a white deposit.

3. The method of preventing the formation of a white deposit in transparent glass containers packed with shelled nuts, which comprises coating the interior of the glass container with a transparent lacquer.

4. The method of preventing the formation of a white deposit in transparent glass containers packed with shelled nuts, which comprises coating the interior of the container with a transparent, colorless, tasteless and odorless lacquer.

DANIEL M. GRAY.